United States Patent
Bae et al.

(10) Patent No.: US 12,535,361 B2
(45) Date of Patent: Jan. 27, 2026

(54) SYSTEM FOR MEASURING SHUTDOWN TEMPERATURE AND MELTDOWN TEMPERATURE OF SEPARATOR

(71) Applicant: LG ENERGY SOLUTION, LTD., Seoul (KR)

(72) Inventors: Won-Sik Bae, Daejeon (KR); Sang-Min Kwak, Daejeon (KR); Joo-Sung Lee, Daejeon (KR); Yong-Won Jeon, Daejeon (KR); Eun-Seon Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 640 days.

(21) Appl. No.: 17/919,666

(22) PCT Filed: Jul. 8, 2021

(86) PCT No.: PCT/KR2021/008753
§ 371 (c)(1),
(2) Date: Oct. 18, 2022

(87) PCT Pub. No.: WO2022/010293
PCT Pub. Date: Jan. 13, 2022

(65) Prior Publication Data
US 2023/0358614 A1   Nov. 9, 2023

(30) Foreign Application Priority Data
Jul. 8, 2020   (KR) ........................ 10-2020-0084323

(51) Int. Cl.
*G01K 1/14*   (2021.01)
*G01K 5/58*   (2006.01)
(Continued)

(52) U.S. Cl.
CPC ............... *G01K 1/14* (2013.01); *G01K 5/58* (2013.01); *G01N 15/082* (2013.01); *H01M 50/491* (2021.01); *G01N 2015/086* (2013.01)

(58) Field of Classification Search
CPC .. G01K 1/14; G01K 5/58; G01K 5/64; G01K 5/70; G01K 7/42; G01K 13/00;
(Continued)

(56) References Cited

U.S. PATENT DOCUMENTS

| | | | |
|---|---|---|---|
| 2009/0170005 A1* | 7/2009 | Kimishima | ......... H01M 50/423 429/249 |
| 2014/0315065 A1 | 10/2014 | Mizuno et al. | |
| 2019/0265305 A1 | 8/2019 | Shin et al. | |

FOREIGN PATENT DOCUMENTS

| | | |
|---|---|---|
| CN | 104020093 A | 9/2014 |
| CN | 104823304 A | 8/2015 |

(Continued)

OTHER PUBLICATIONS

CN-109374492-A translation Cheng (Year: 2019).*
(Continued)

*Primary Examiner* — Kristina M Deherrera
(74) *Attorney, Agent, or Firm* — Morgan, Lewis & Bockius LLP (57) ABSTRACT

The present disclosure relates to a system for determining the shut-down temperature and melt-down temperature of a separator. The system includes a jig having a through-hole, a heating unit, a temperature sensor, a controlling unit and an air permeability-determining unit. In this manner, it is possible to provide a novel system for determining the shut-down temperature and melt-down temperature of a separator by using the air permeability (Gurly value) of the separator.

11 Claims, 3 Drawing Sheets

(51) Int. Cl.
*G01N 15/08* (2006.01)
*H01M 50/491* (2021.01)

(58) Field of Classification Search
CPC .................. G01N 15/08; G01N 15/082; G01N 2015/084; G01N 2015/086; H01B 7/009; H01M 50/471; Y02E 60/10
USPC .......................................................... 374/208
See application file for complete search history.

(56) References Cited

FOREIGN PATENT DOCUMENTS

| CN | 207317967 | U | | 5/2018 | |
|----|-----------|---|---|--------|---|
| CN | 109374492 | A | * | 2/2019 | ............. G01N 15/08 |
| JP | H09-126986 | A | | 5/1997 | |
| JP | 2003-279465 | A | | 10/2003 | |
| JP | 2015-043288 | A | | 3/2015 | |
| KR | 10-2008-0038541 | A | | 5/2008 | |
| KR | 10-1389780 | B1 | | 4/2014 | |
| KR | 10-1692060 | B1 | | 1/2017 | |
| KR | 10-1980844 | B1 | | 5/2019 | |
| WO | 2009/147994 | A1 | | 12/2009 | |

OTHER PUBLICATIONS

International Search Report (with partial translation) and Written Opinion dated Oct. 25, 2021, for corresponding International Patent Application No. PCT/KR2021/008753.
Extended European Search Report issued Sep. 14, 2023 in counterpart European Patent Application No. 21837864.4.
Office Action dated Mar. 15, 2025, issued in corresponding Chinese Patent Application No. 202180031012.9.

* cited by examiner

SYSTEM FOR MEASURING SHUTDOWN TEMPERATURE AND MELTDOWN TEMPERATURE OF SEPARATOR

TECHNICAL FIELD

The present disclosure relates to a system for determining the shut-down temperature and melt-down temperature of a separator. Particularly, the present disclosure relates to a novel system for determining temperature using air permeability.

The present application claims priority to Korean Patent Application No. 10-2020-0084323 filed on Jul. 8, 2020 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles.

In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

The separator used for a lithium secondary battery functions to physically interrupt the positive electrode and the negative electrode from being in contact with each other and to insulate the positive electrode and the negative electrode electrically from each other, while allowing lithium-ion transport. Particularly, the separator is known to significantly affect the characteristics and safety of a battery in that it functions to retain insulation property for preventing an internal short-circuit of the battery. More particularly, active studies have been conducted about a decrease in the shut-down temperature of a separator and an increase in the melt-down temperature of a separator in order to enhance the safety of the lithium secondary battery. Therefore, it is important to determine the shut-down temperature and melt-down temperature accurately.

According to the related art, a separator was observed in terms of its shrinking behavior by using thermal mechanical analysis (TMA), while increasing the temperature. Otherwise, a coin cell having a separator interposed therein was manufactured and the ion conductivity or variations in resistance were determined, while increasing the temperature.

However, when using such a TMA instrument, blocking of pores as lithium-ion transport channels is not determined directly but is determined indirectly by using a change in dimension of the separator, and thus an accurate shut-down temperature cannot be determined. In addition, there is a problem in that a coin cell having a separator interposed therein should be prepared in order to determine ion conductivity. There is another problem in that the electrolyte is vaporized, when the temperature is increased to carry out a safety test.

DISCLOSURE

Technical Problem

The present disclosure is designed to solve the problems of the related art, and therefore the present disclosure is directed to providing a novel system for directly determining the shut-down temperature and melt-down temperature of a separator by using the air permeability of the separator. Such a system allows more precise determination of the shut-down temperature and melt-down temperature. In addition, there is an advantage in that it is not required to prepare a separate coin cell to determine the shut-down temperature or melt-down temperature of the separator. There is another advantage in that it is not required to use an electrolyte in carrying out a safety test.

The present disclosure is not limited to the above-mentioned technical problems, and other objects of the present disclosure may be understood from the following detailed description and will become more fully apparent from the exemplary embodiments of the present disclosure.

Technical Solution

In one aspect of the present disclosure, there is provided a system for determining the shut-down temperature and melt-down temperature of a separator according to any one of the following embodiments.

According to the first embodiment, there is provided a system for determining the shut-down temperature and melt-down temperature of a separator, including:

- an air permeability-determining unit 170 configured to determine the air permeability (Gurley value) of the separator:
- a first jig 120 configured to fix one side of the separator and having a first through-hole through which the air discharged from the air permeability-determining unit is introduced:
- a second jig 130 disposed at a position opposite to the first jig based on the separator, configured to fix the other side of the separator, and having a second through-hole through which the air passing through the first through-hole and the pores in the separator is introduced:
- a heating unit 140 configured to heat the first jig or the second jig:
- a temperature sensor 150 configured to measure the temperature of the first jig or the second jig; and
- a controlling unit 160 configured to control the heating unit and the temperature sensor,
- wherein the controlling unit calculates the shut-down temperature and melt-down temperature of the separator by using the temperature measured by the temperature sensor as a function of time and the air permeability (Gurley vale) of the separator determined by the air permeability-determining unit.

According to the second embodiment, there is provided the system for determining the shut-down temperature and melt-down temperature of a separator as defined in the first embodiment, wherein the air permeability-determining unit is linked to the first jig, and the controlling unit is linked to the first jig and the second jig.

According to the third embodiment, there is provided the system for determining the shut-down temperature and melt-down temperature of a separator as defined in the first or the second embodiment, wherein the heating unit and the temperature sensor are linked to at least one of the first jig and the second jig.

According to the fourth embodiment, there is provided the system for determining the shut-down temperature and melt-down temperature of a separator as defined in any one of the first to the third embodiments, wherein the separator is interposed between the first jig and the second jig.

According to the fifth embodiment, there is provided the system for determining the shut-down temperature and melt-down temperature of a separator as defined in any one of the first to the fourth embodiments, which further includes a display unit configured to display the temperature in X axis as a function of time and the air permeability (Gurley value) of the separator in Y axis as a function of time.

According to the sixth embodiment, there is provided the system for determining the shut-down temperature and melt-down temperature of a separator as defined in any one of the first to the fifth embodiments, wherein the shut-down temperature (A) is a temperature corresponding to an air permeability (Gurley value) of 100,000 sec/100 cc, when the temperature is increased as a function of time.

According to the seventh embodiment, there is provided the system for determining the shut-down temperature and melt-down temperature of a separator as defined in any one of the first to the sixth embodiments, wherein the melt-down temperature (B) is a temperature where the separator is broken after the shut-down temperature and the air permeability (Gurley value) of the separator starts to be decreased, and the melt-down temperature is a temperature corresponding to an air permeability (Gurley value) of 100,000 sec/100 cc after the shut-down temperature.

According to the eighth embodiment, there is provided the system for determining the shut-down temperature and melt-down temperature of a separator as defined in any one of the first to the seventh embodiments, wherein the hole in the first through-hole and the hole in the second through-hole have an average diameter of 2-15 mm.

According to the ninth embodiment, there is provided the system for determining the shut-down temperature and melt-down temperature of a separator as defined in any one of the first to the eighth embodiments, which further includes a storage unit configured to record the calculated shut-down temperature and melt-down temperature of the separator.

According to the tenth embodiment, there is provided the system for determining the shut-down temperature and melt-down temperature of a separator as defined in any one of the first to the ninth embodiments, which further includes a display unit configured to display the calculated shut-down temperature and melt-down temperature of the separator.

Advantageous Effects

According to an embodiment of the present disclosure, it is possible to provide a novel system for directly determining the shut-down temperature and melt-down temperature of a separator by using the air permeability of the separator.

The system requires a shorter time for determination as compared to the conventional systems and allows more precise determination of the shut-down temperature and melt-down temperature.

In addition, there is an advantage in that it is not required to prepare a separate coin cell to determine the shut-down temperature or melt-down temperature of the separator.

There is another advantage in that it is not required to use an electrolyte in carrying out a safety test.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

First, the overall constitution of the system for determining the shut-down temperature and melt-down temperature of a separator according to an embodiment of the present disclosure will be explained with reference to FIG. 1.

Figure 1:
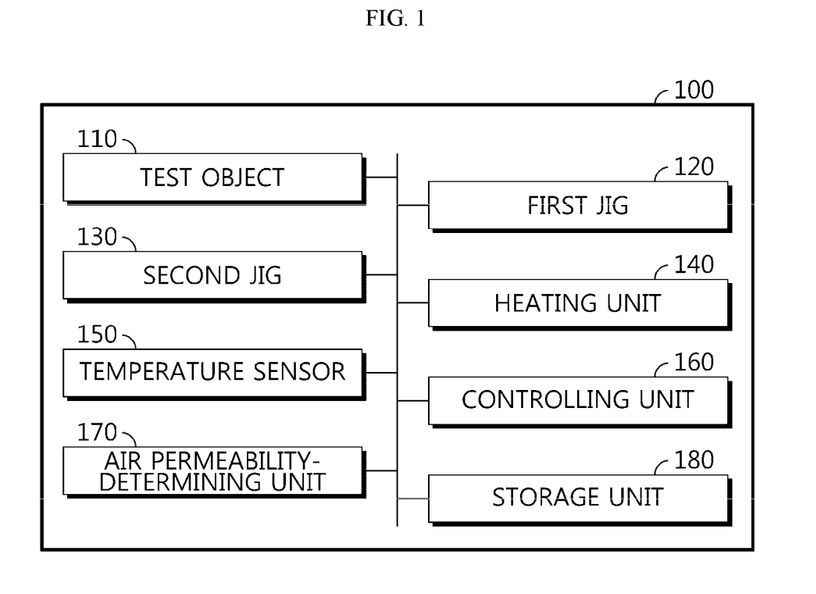
FIG. 1 is a schematic block diagram illustrating the functional constitution of the system for determining the shut-down temperature and melt-down temperature of a separator according to an embodiment of the present disclosure.

FIG. 1 is a schematic view illustrating the constitution of the system for determining the shut-down temperature and melt-down temperature of a separator according to an embodiment of the present disclosure.

Referring to FIG. 1, the system 100 for determining the shut-down temperature and melt-down temperature of a separator according to an embodiment of the present disclosure is one capable of evaluating the safety of a test object 110, and includes jigs 120, 130, a heating unit 140, a temperature sensor 150, a controlling unit 160 and an air permeability-determining unit 170. In addition, the system 100 for determining the shut-down temperature and melt-down temperature of a separator according to an embodiment of the present disclosure may optionally further include a storage unit 180 and a display unit 190 (not shown).

The test object 110 may be a separator. Any separator may be used with no particular limitation, as long as it physically interrupts a contact between a negative electrode and a positive electrode and has electrical insulation property. An insulating thin film interposed between the positive electrode and the negative electrode and having high ion permeability and mechanical strength may be used as the separator. The separator has pores, and generally may have a pore diameter of 0.01-10 μm and a thickness of 5-300 μm. Non-limiting examples of the separator may include a sheet or nonwoven web made of an olefinic polymer, such as polyethylene or polypropylene, having chemical resistance and hydrophobicity, glass fibers, polyethylene, or the like. In some cases, the separator may further include an organic/inorganic porous coating layer containing inorganic particles and a binder polymer on the outermost surface of the separator in order to enhance the heat resistance and stability of the separator. The separator may be a solid electrolyte. Herein, any porous polymer substrates, binder polymers and inorganic particles may be used with no particular limitation, as long as they may be used conventionally in the art. In a variant, the separator may include a porous polymer substrate, such as a crosslinked polyolefin including polyolefin, an alkoxy group-containing vinylsilane and a crosslinking catalyst.

The separator used for a lithium secondary battery functions to physically interrupt the positive electrode and the negative electrode from being in contact with each other and to insulate the positive electrode and the negative electrode electrically from each other, while allowing lithium-ion transport. Particularly, the separator is known to significantly affect the characteristics and safety of a battery in that it functions to retain insulation property for preventing an internal short-circuit of the battery. More particularly, active studies have been conducted about a decrease in the shut-down temperature of a separator and an increase in the melt-down temperature of a separator in order to enhance the safety of the lithium secondary battery. Therefore, it is important to determine the shut-down temperature and melt-down temperature accurately.

According to the related art, a separator was observed in terms of its shrinking behavior by using thermal mechanical analysis (TMA), while increasing the temperature. Otherwise, a coin cell having a separator interposed therein was manufactured and the ion conductivity or variations in resistance were determined, while increasing the temperature.

However, when using such a TMA instrument, blocking of pores as lithium-ion transport channels is not determined directly but is determined indirectly by using a change in dimension of the separator, and thus an accurate shut-down temperature cannot be determined. In addition, there is a problem in that a coin cell having a separator interposed therein should be prepared in order to determine ion conductivity. There is another problem in that the electrolyte is vaporized, when the temperature is increased to carry out a safety test.

On the contrary, according to an embodiment of the present disclosure, the shut-down temperature and melt-down temperature of a separator is determined directly by using a change in the air permeability (Gurley value) of the separator depending on a change in temperature. Therefore, it is possible to provide a shorter time for determination as compared to the conventional systems and to allow more precise determination of the shut-down temperature and melt-down temperature.

As used herein, the term 'shut-down temperature' refers to a specific point of temperature in a region wherein the air permeability (Gurley value) of a separator is increased rapidly. Particularly, the shut-down temperature may be calculated from experimentally derived values. More particularly, the shut-down temperature may be calculated by using the controlling unit 160 as described hereinafter.

For example, the shut-down temperature may be determined as a temperature at which the increment of air permeability is reduced in a range of temperature corresponding to an air permeability (Gurley value) of 10,000 sec/100 cc or more, when the temperature is increased as a function of time.

According to an embodiment of the present disclosure, the shut-down temperature may be determined as a temperature (A) at a specific point in a region wherein the air permeability is 10,000 sec/100 cc to 100,000 sec/100 cc. According to a particular embodiment, the shut-down temperature may be a temperature at a point corresponding to an air permeability of 10,000 sec/100, or 100,000 sec/100 cc.

Figure 4:
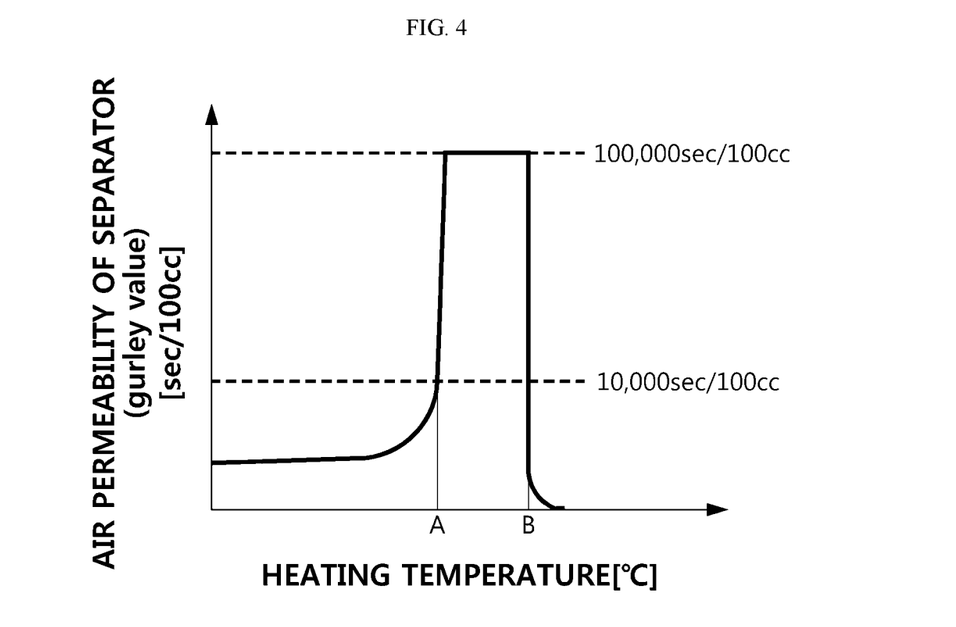
FIG. 4 is a graph illustrating the shut-down temperature and melt-down temperature of a separator plotted by using the temperature and air permeability (Gurley value) of the separator as a function of time for the test objects prepared according to Examples 1 and 2 and Comparative Examples 1 and 2.

Referring to FIG. 4, it is shown that after the air permeability is increased rapidly from 10,000 sec/100 cc to 100,000 sec/100 cc, it is not increased any longer beyond 100,000 sec/100 cc but is retained. Therefore, it can be seen that even when the shut-down temperature is determined as a specific point, A, in such a region, it shows no significant deviation from a point where the increment of air permeability is reduced actually.

As used herein, the term 'melt-down temperature' refers to a temperature where a separator is broken at a temperature higher than the melting point thereof, when the temperature is increased as a function of time. In other words, the melt-down temperature means a temperature at a point where the separator is broken after the shut-down temperature and the air permeability (Gurley value) of the separator starts to be decreased. Particularly, the melt-down temperature may be calculated from experimentally derived values. More particularly, the melt-down temperature may be calculated by using the controlling unit 160 as described hereinafter.

According to an embodiment of the present disclosure, the melt-down temperature may be determined as a temperature (B) at a specific point in a region wherein the air permeability is 100,000 sec/100 cc to 1,000 sec/100 cc. According to a particular embodiment, the melt-down temperature may be a temperature at a point corresponding to an air permeability of 10,000 sec/100 cc.

Referring to FIG. 4, it is shown that after the increment of air permeability is retained, the air permeability is decreased rapidly from 100,000 sec/100 cc to 10,000 sec/100 cc.

Therefore, it can be seen that even when the melt-down temperature is determined as a specific point, B, in such a region, it shows no significant deviation from a point where the air permeability starts to be decreased actually.

According to an embodiment of the present disclosure, the shut-down temperature may be determined particularly as a temperature at a point corresponding to an air permeability of 100,000 sec/100 cc, and the melt-down temperature may be determined particularly as a temperature at a point corresponding to an air permeability of 100,000 sec/100 cc or a point corresponding to an air permeability of 10,000 sec/100 cc.

FIG. 4 is a schematic view illustrating the shut-down temperature and melt-down temperature as defined herein.

Referring to FIG. 4, X axis means a temperature (° C.) as a function of time. Referring to FIG. 4, Y axis means the air permeability (Gurley value) (sec/100 cc) of a separator as a function of time. In FIG. 4, the shut-down temperature is a temperature at a specific point in a region corresponding to an air permeability (Gurley value) of 10,000 sec/100 cc to 100,000 sec/100 cc, when the temperature is increased as a function of time, or a temperature at a point where the increment of air permeability is decreased, and may be represented by 'A'. In FIG. 4, the melt-down temperature is a temperature at a specific point in a region corresponding to an air permeability (Gurley value) of 100,000 sec/100 cc to 1,000 sec/100 cc, after the shut-down temperature, or a temperature at a point where the air permeability starts to be decreased, and may represented by 'B'.

Figure 2:
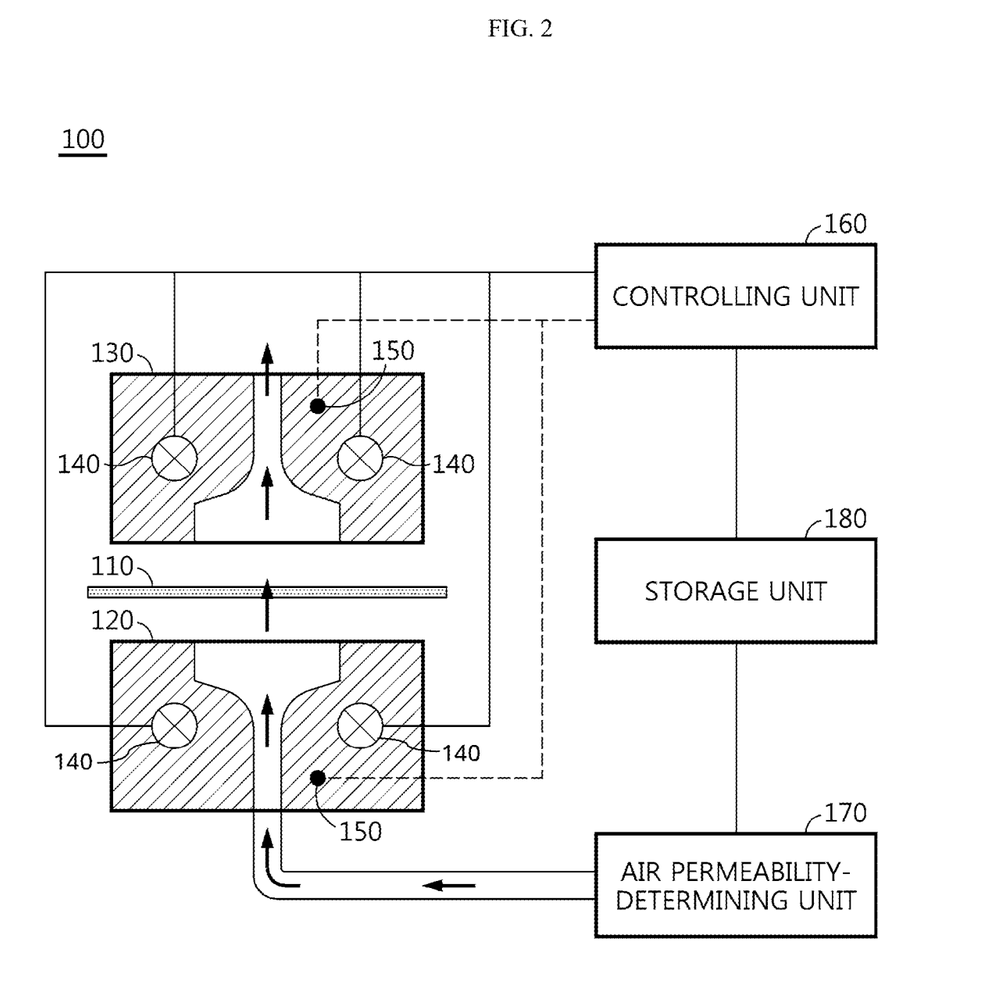
FIG. 2 is a schematic view illustrating the constitution of the system for determining the shut-down temperature and melt-down temperature of a separator according to an embodiment of the present disclosure.

Referring to FIG. 1 and FIG. 2, the system includes a first jig 120 configured to fix one side of the separator as a test object 110 and having a first through-hole through which the air discharged from the air permeability-determining unit is introduced. In addition, the system includes a second jig 130 disposed at a position opposite to the first jig based on the separator, configured to fix the other side of the separator, and having a second through-hole through which the air passing through the first through-hole and the pores in the separator is introduced.

The jigs 120, 130 are used for holding the test object 110 to be evaluated in terms of safety characteristics. The jigs may include the first jig 120 and the second jig 130 which may face each other. The jigs 120, 130 may include any material, as long as the material fixes the test object 110.

Each of the heating unit 140 and the temperature sensor 150 may be disposed on at least one of the first jig and the second jig. In addition, the separator 110 may be interposed between the first jig 120 and the second jig 130. Meanwhile, the through-hole formed in the first jig or the second jig may penetrate from the lateral side of the first jig or the second jig to the top and bottom surfaces of the first jig or the second jig.

Referring to FIG. 1 and FIG. 2, the heating unit 140 may be provided in at least one of the first jig and the second jig. For example, the heating unit may be linked to at least one of the first jig and the second jig. The heating unit 140 heats the test object 110 by heating the jigs. The controlling unit 160 may be electrically connected with the heating unit 140 and may control the operation of the heating unit 140. Therefore, the heating unit 140 heats the test object 110 to a predetermined temperature according to the control command input from the controlling unit 160. Finally, a graph illustrating the shut-down temperature and melt-down temperature may be plotted by the display unit 190.

Preferably, the heating unit 140 may be a hot wire installed in the second jig 130. The hot wire may be installed in the first jig 120, not the second jig 130, or may be installed in both the first jig 120 and the second jig 130. In a variant, the hot wire may be installed on the other surface where the first jig 120 or the second jig 130 is in contact with the test object. Particularly, the heating unit 140 may increase the temperature gradually as a function of time. Herein, the heating unit 140 may be electrically connected with the controlling unit 160, and may supply heat to the first jig or the second jig under the control of the controlling unit 160. In this manner, it is possible to observe the thermal properties of the separator interposed between the first jig and the second jig. The heating unit 140 may be electrically connected with the temperature sensor 150.

The temperature sensor 150 may be electrically connected with each of the first jig 120 and the second jig 130. In other words, the temperature sensor 150 may be connected to both ends of each jig. For example, the temperature sensor 150 may be directly connected with each of the first jig 120 and the second jig 130. For example, the temperature sensor 150 may be provided in the first jig 120 or the second jig 130.

The temperature sensor 150 measures the temperature of the separator heated by the heating unit 140.

According to the present disclosure, when the temperature sensor 150 measures the temperature of the separator, the temperature of the separator is room temperature, before the temperature is increased by the heating unit 140. However, when heat is supplied to the separator by the heating unit 140, the temperature of the separator is increased with the lapse of a predetermined time. The temperature sensor 150 measures the temperature increased in this case.

According to the present disclosure, the air permeability-determining unit 170 is directly linked to at least one of the first jig and the second jig. For example, the air permeability-determining unit 170 may be directly linked to the first jig or the second jig. For example, the air permeability-determining unit may be linked to the first jig.

Particularly, the air permeability (Gurley value)-determining unit 170 determines the air permeability (Gurley value) based on the following principle. The air permeability-determining unit is directly linked to the first jig 120 or the second jig 130. In addition, when air is injected to the test object 110 combined with the first and the second jigs 120, 130 under a predetermined pressure, the injected air undergoes a change in pressure depending on the properties of the separator as the test object 110. It is possible to determine the air permeability (Gurley value), which is a time required for a unit volume of air to pass through the separator, by using the changed air pressure. For example, determination of the air permeability may be carried out by the Oken air permeability tester (Asahi Seiko Co.). For example, determination of the air permeability may be carried out by measuring the time required for 100 cc of air to pass through the separator with the Oken air permeability tester.

According to the present disclosure, the controlling unit 160 controls the heating unit 140 and the temperature sensor 150. In addition, the controlling unit 160 calculates the shut-down temperature and melt-down temperature of the separator by using the temperature measured by the temperature sensor 150 as a function of time and the air permeability (Gurley value) of the separator determined by the air permeability-determining unit 170.

The controlling unit 160 may be electrically connected to each of the heating unit 140, temperature sensor 150, air permeability-determining unit 170, first jig 120 and the second jig 130. For example, the controlling unit 160 may be directly linked to the heating unit 140, temperature sensor 150 and the air permeability-determining unit 170. For example, the controlling unit may be linked to the first jig 120 and the second jig 130.

The controlling unit 160 receives the temperature measured by the temperature sensor 150 as a function of time and the air permeability (Gurley value) of the separator determined by the air permeability-determining unit 170 as a function of time, while heat is supplied to the separator by the heating unit 140 to an extent increasing with time, and the temperature and the air permeability may be taken as X axis and Y axis, respectively, to calculate the shut-down temperature and melt-down temperature of the separator. Herein, X axis means the temperature (° C.) as a function of time, and Y axis means a change in air permeability (sec/100 cc) (Gurley value) of the separator as a function of time.

The controlling unit 160 can calculate the shut-down temperature and melt-down temperature of the separator from the temperature and the air permeability (Gurley value) received from the temperature sensor 150 and the air permeability-determining unit 170.

The controlling unit 160 can store the calculated shut-down temperature and melt-down temperature of the separator in the storage unit 180. Then, the temperature corresponding to an air permeability (Gurley value) of 100,000 sec/100 cc, when the temperature is increased as a function of time, is defined as the shut-down temperature, and the temperature at a point where the air permeability (Gurley value) starts to be decreased from 100,000 sec/100 cc after the shut-down temperature is defined as the melt-down temperature.

The storage unit 180 is not limited to any particular type, as long as it is a storage medium capable of recording and eliminating information. For example, the storage unit 180 may be RAM, ROM, EEPROM, DRAM, SDRAM, a resistor, a hard disc, an optical recording medium or a magnetic recording medium. The storage unit 180 may be electrically connected to the controlling unit 160 through a data bus, or the like, so that it may be approached by the controlling unit 160. The storage unit 180 may storage, update, eliminate and/or transmit data generated when programs and/or controlling logics, including various controlling logics performed by the controlling unit 160, are carried out. The storage unit 180 may be divided into two or more units logically. The storage unit 180 may be included in the controlling unit 160, but is not limited thereto.

The controlling unit 160 may display the calculated shut-down temperature and melt-down temperature of the separator on the display unit 190.

The display unit 190 may output the shut-down temperature and melt-down temperature of the separator determined for the test object 110 by the controlling unit 160 through an external display. For example, the results of calculation of the shut-down temperature and melt-down temperature of the separator may be output through a display in the form of letters, numbers, images, or the like. The results of calculation of the shut-down temperature and melt-down temperature of the separator may include the shut-down temperature of the separator, shut-down change profile, melt-down temperature, melt-down temperature change profile, or a combination thereof.

The display unit 190 may be electrically connected to the controlling unit 160, and the controlling unit 160 may output the results of the shut-down temperature, melt-down temperature or change profiles thereof through the display unit 190. The display unit 190 may include a liquid crystal display, an organic light-emitting diode display or a light-emitting diode display, but the scope of the present disclosure is not limited thereto.

FIG. 2 is a schematic view illustrating the constitution of the system for determining the shut-down temperature and melt-down temperature of a separator according to an embodiment of the present disclosure.

Referring to FIG. 2, the system 100 for determining the shut-down temperature and melt-down temperature of a separator may include two jigs 120, 130 facing each other, a heating unit 140 linked to the two jigs 120, 130, a temperature sensor 150, a controlling unit 160 and an air permeability-determining unit 170. The system may further include a storage unit 180 and a display unit 190.

Referring to FIG. 2, the system 100 for determining the shut-down temperature and melt-down temperature of a separator may hold a test object 110 between the first jig 120 and the second jig 130.

Figure 3:
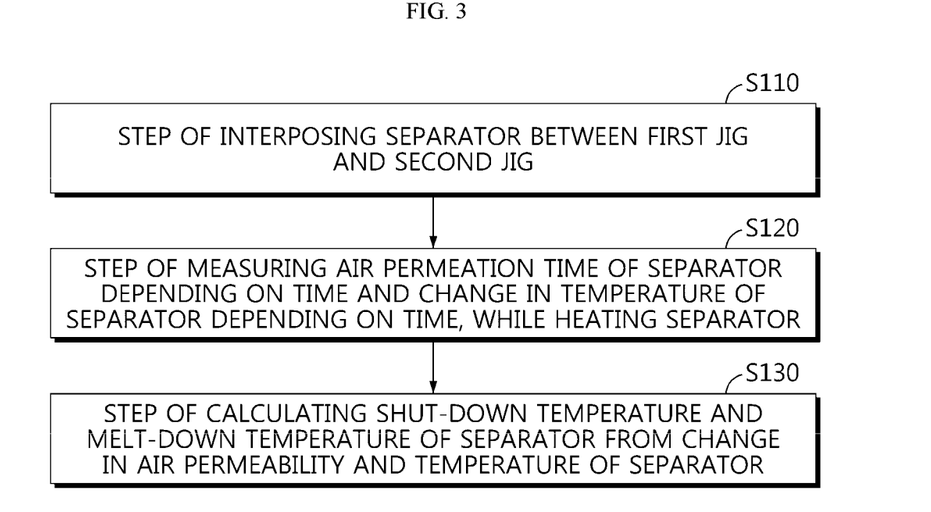
FIG. 3 is a flow chart illustrating the method for determining the shut-down temperature and melt-down temperature of a separator.

FIG. 3 is a flow chart illustrating the method for determining the shut-down temperature and melt-down temperature of a separator according to an embodiment of the present disclosure.

Referring to FIG. 1 and FIG. 3, in the method for determining the shut-down temperature and melt-down temperature of a separator according to an embodiment of the present disclosure, the test object 110, i.e. separator, is interposed first between the first jig and the second jig facing each other (S110). Thus, the test object 110 is fixed between the jigs 120, 130, and the fixing method is not particularly limited.

The test object may be a separator. For example, the test object, i.e. separator, may be a porous polymer substrate itself, and may have a porous coating layer including inorganic particles and a binder polymer on at least one surface of the separator.

For example, when the test object has a porous coating layer, the test object 110 may be prepared as follows. First, slurry containing inorganic particles, a binder polymer and an organic solvent is prepared.

There is no particular limitation in the inorganic particles, as long as they are electrochemically stable. In other words, there is no particular limitation in the inorganic particles that may be used herein, as long as they cause no oxidation and/or reduction in the range (e.g. 0-5 V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, inorganic particles having lithium-ion transportability or a combination thereof.

The inorganic particles having a dielectric constant of 5 or more may include any one selected from the group consisting of $Al_2O_3$, $SiO_2$, $ZrO_2$, $AlO(OH)$, $TiO_2$, $BaTiO_3$, $Pb(Zr_xTi_{1-x})O_3$ (PZT, wherein $0<x<1$), $Pb_{1-x}La_xZr_{1-y}Ti_yO_3$ (PLZT, wherein $0<x<1$, $0<y<1$), $(1-x)Pb(Mg_{1/2}Nb_{2/3})O_{3-x}PbTiO_3$ (PMN-PT, wherein $0<x<1$), hafnia ($HfO_2$), $SrTiO_3$, $SnO_2$, $CeO_2$, MgO, NiO, CaO, ZnO, $ZO_3$ and SiC, or a mixture of two or more of them.

The inorganic particles having lithium-ion transportability may be any one selected from the group consisting of include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<<<3$), $(LiAlTiP)_xO_y$-based glass ($1<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$), or a mixture of two or more of them.

In addition, there is no particular limitation in the average particle diameter of the inorganic particles. However, the inorganic particles preferably have an average particle diameter of 0.001-10 μm in order to form a coating layer with a uniform thickness and to provide suitable porosity. Particularly, the average particle diameter of the inorganic particles may be preferably 100 nm or more, 150 nm or more, or 200 nm or more, and 1000 nm or less, 900 nm or less, 800 nm or less, or 700 nm or less.

The binder polymer is not particularly limited, as long as it can bind the inorganic particles among themselves. Non-limiting examples of the binder polymer may include polyvinylidene fluoride, polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, or the like.

The organic solvent preferably has a solubility parameter similar to the solubility parameter of the binder polymer to be used and has a low boiling point. This is because such a solvent facilitates homogeneous mixing and the subsequent solvent removal. Non-limiting examples of the solvent that may be used include any one selected from water, acetone, tetrahydrofuran, methylene chloride, chloroform, dimethyl formamide, N-methyl-2-pyrrolidone, methyl ethyl ketone and cyclohexane, or a mixture of two or more of them.

Next, the slurry containing a plurality of inorganic particles, a binder polymer and an organic solvent is applied onto the test object 110, i.e. separator, followed by drying, to obtain a separator having a porous coating layer including the inorganic particles bound to one another by the binder polymer. Although there is no particular limitation in the process for applying the slurry for forming a porous coating layer, it is preferred to use a slot coating or dip coating process. A slot coating process includes coating a slurry supplied through a slot die onto the whole surface of a separator and is capable of controlling the thickness of a coating layer depending on the flux supplied from a metering pump. In addition, a dip coating process includes dipping a substrate into a tank containing a slurry to carry out coating and is capable of controlling the thickness of a coating layer depending on the concentration of the slurry and the rate of removing the substrate from the tank. Further, in order to control the coating thickness more precisely, it is possible to carry out post-metering through a Mayer bar or the like, after dipping.

Then, the separator coated with the slurry may be dried in a dryer, such as an oven, to form a porous coating layer on at least one surface of the separator.

Referring to FIG. 1 and FIG. 3, the test object 110 is interposed between the first jig 120 and the second jig 130, and then the air permeation time, i.e. air permeability (Gurley value) of the separator as a function of time and a change in temperature of the separator as a function of time are measured, while heating the test object 110 (S120).

Then, the controlling unit 160 supplies heat increasing with time between the upper jig 120 and the lower jig 130, to which the test object 110 is inserted, by using the heating unit 140. Herein, the controlling unit 160 measures the temperature input constantly from the heating unit 140 by the temperature sensor 150 and records the temperature in the storage unit 180. In addition, the controlling unit 160 stores the air permeability (Gurley value) received from the air permeability-determining unit 170 in the storage unit 180.

After that, the controlling unit 160 determines the melt-down temperature and shut-down temperature of the separator from a change in temperature as a function of time, received from the temperature sensor 150, and the air permeability (Gurley value) of the separator received from the air permeability-determining unit 170 (S130).

The controlling unit 160 may output the determined melt-down temperature and shut-down temperature through the display unit 190. In addition, the controlling unit may display the melt-down temperature and shut-down temperature change profiles of the separator on the display unit 190. Herein, the controlling unit 160 may refer the data recorded in the storage unit 170.

According to the present disclosure, any electrochemical device may be used with no particular limitation, as long as it includes an electrode having its own conductivity and porosity. For example, the system may be applied to a secondary battery, a super capacitor, a storage battery, a fuel cell, or the like.

According to an embodiment of the present disclosure, the secondary battery may include a lithium-ion secondary battery, lithium polymer secondary battery, lithium metal secondary battery or a lithium-ion polymer secondary battery.

Hereinafter, the method for evaluating the insulation properties of a separator for an electrochemical device depending on the structure of a test object will be explained in more detail with reference to examples. However, the following examples are for illustrative purposes only, and the scope of the present disclosure is not limited thereto.

Example 1

A separator was prepared as follows.

First, 10.5 kg of high-density polyethylene (Daehan Oil & Chem. VH035) having a weight average molecular weight of 600,000 as a polyolefin, 19.5 kg of liquid paraffin oil (Kukdong Oil & Chem. LP 350F, 68 cSt) as a diluting agent, 450 g of trimethoxyvinylsilane as an alkoxy group-containing vinylsilane, 6 g of dibutyl tin dilaurate as a crosslinking catalyst, and 6 g of 2,5-dimethyl-2,5-di(tert-butylperoxy) hexane (DHBP) as an initiator were introduced to an extruder at once and mixed therein.

Next, reactive extrusion was carried out at a temperature of 200° C. to obtain a silane-grafted polyolefin composition.

The resultant silane-grafted polyolefin composition was molded into a sheet-like shape through a T-die and a cold casting roll. Then, biaxial orientation was carried out by using a tenter type sequential orientation machine. Both of MD orientation and TD orientation were carried out at a ratio of 7.0. The orientation temperature was 110° C. in MD and 125° C. in TD.

After that, the oriented sheet was extracted with methylene chloride, and thermal fixing was carried out at 126° C. to obtain a porous membrane. The porous membrane was crosslinked at 85° C. under a relative humidity of 85% for 24 hours to obtain a crosslinked polyolefin separator. The resultant separator had a thickness of 9.5 μm.

The prepared separator was determined in terms of thermal properties by using the system according to the present disclosure at a heating rate of 5° C./min. The results are shown in the following Table 1.

Example 2

A separator was prepared as follows.

First, 9.45 kg of high-density polyethylene (Daehan Oil & Chem. VH035) having a weight average molecular weight of 600,000 as a polyolefin, 1.05 kg of polyethylene-co-octene having a melt index (ASTM D1238) of 1.2 g/10 min as a polyolefin elastomer and 19.5 kg of liquid paraffin oil (Kukdong Oil & Chem. LP 350F, 68 cSt) as a diluting agent were introduced to an extruder and mixed therein at a temperature of 200° C.

The prepared polyethylene composition was molded into a sheet-like shape through a T-die and a cold casting roll. Then, biaxial orientation was carried out by using a tenter type sequential orientation machine performing MD orientation and then TD orientation. Both of MD orientation and TD orientation were carried out at a ratio of 7.0. The orientation temperature was 110° C. in MD and 125° C. in TD.

After that, the first diluting agent and the second diluting agent in the oriented sheet were extracted with methylene chloride, and thermal fixing was carried out at 126° C. to obtain a porous membrane. The resultant separator had a thickness of 9.3 μm.

The prepared separator was determined in terms of thermal properties by using the system according to the present disclosure at a heating rate of 5° C./min. The results are shown in the following Table 1.

Comparative Example 1

The separator according to Example 1 was determined in terms of thermal properties by using a thermal mechanical analysis (TMA) system. The results are shown in the following Table 1.

Comparative Example 2

The separator according to Example 1 was interposed between a positive electrode and a negative electrode to obtain a coin cell. Then, the ion conductivity of the separator was determined at a heating rate of 5° C./min. The results are shown in the following Table 1.

TABLE 1

|  | Example 1 | Example 2 | Comp. Ex. 1 | Comp. Ex. 2 |
| --- | --- | --- | --- | --- |
| Thickness (μm) | 9.5 | 9.3 | 9.5 | 9.5 |
| Air permeability (Gurley value) (sec/100 cc) | 76 | 69 | 76 | 76 |
| Shut-down temperature | 1443° C. | 136° C. | Not available | 142° C. |
| Melt-down temperature | 183° C. | 145° C. | 187° C. | Not available |
| Accuracy | High | High | Low | High |
| Required time | Short | Short | Short | Long |
| Reproducibility | High | High | High | Low |

In Table 1, 'accuracy' means how accurately the shut-down temperature and melt-down temperature are determined. Particularly, the accuracy may be determined as being within a range of #3° C. from the average of five values of each of the shut-down temperature and melt-down temperature determined by using the system according to the present disclosure.

In Table 1, 'required time' means the time required for determining the shut-down temperature and melt-down temperature.

In Table 1, 'reproducibility' means that the results are obtained normally with no trouble, when the shut-down temperature and melt-down temperature of the same sample are determined continuously. When the shut-down temperature and melt-down temperature are determined five times and all of the results are normal, the results can be defined as highly reproducible.

In the description of various embodiments of the present disclosure, it is to be understood that the constitutional elements called 'unit' are not physically differentiated elements but are functionally differentiated elements. Therefore, each constitutional element may be optionally integrated with another constitutional element, or each constitutional element may be divided into sub-elements in order to carry out control logic(s) efficiently. However, it is apparent to those skilled in the art that even when such constitutional elements are integrated or divided, the integrated or divided constitutional elements should be interpreted as being within the scope of the present disclosure.

The present disclosure has been described in detail with reference to preferred embodiments and drawings. However, it should be understood that the detailed description and specific examples are given by way of illustration only, since various changes and modifications within the scope of the disclosure will become apparent to those skilled in the art from this detailed description.

DESCRIPTION OF DRAWING NUMERALS

100: System for determining shut-down temperature and melt-down temperature of separator
110: Separator
120: First jig
130: Second jig
140: Heating unit
150: Temperature sensor
160; Controlling unit
170: Air permeability-determining unit
180: Storage unit
190: Display unit

What is claimed is:

1. A system for determining shut-down temperature and melt-down temperature of a separator, comprising:
an air permeability-determining unit determining air permeability (Gurley value) of the separator;
a first jig arranged on one side of the separator and having a first through-hole through which air discharged from the air permeability-determining unit is introduced;
a second jig arranged on other side of the separator which is an opposite surface of the one side of the separator, and having a second through-hole through which air passing through the first through-hole and pores in the separator is introduced;
a heating unit heating the first jig and the second jig;
a temperature sensor measuring temperature of the first jig or the second jig; and
a controlling unit controlling the heating unit and the temperature sensor,
wherein the controlling unit calculates the shut-down temperature and the melt-down temperature of the separator by using the temperature measured by the temperature sensor as a function of time and the air permeability (Gurley value) of the separator determined by the air permeability-determining unit,
the heating unit is included in the first jig and the second jig,
the heating unit comprises a hot wire, and
the hot wire is installed on the other surface where the first jig or the second jig is in contact with the separator.

2. The system for determining shut-down temperature and melt-down temperature of a separator according to claim 1, wherein the air permeability-determining unit is linked to the first jig, and the controlling unit is linked to the first jig and the second jig.

3. The system for determining shut-down temperature and melt-down temperature of a separator according to claim 1, wherein the heating unit and the temperature sensor are linked to at least one of the first jig or the second jig.

4. The system for determining shut-down temperature and melt-down temperature of a separator according to claim 1, wherein the separator is interposed between the first jig and the second jig.

5. The system for determining shut-down temperature and melt-down temperature of a separator according to claim 1, further comprising a display unit displaying the temperature in X axis as the function of time and the air permeability (Gurley value) of the separator in Y axis as the function of time.

6. The system for determining shut-down temperature and melt-down temperature of a separator according to claim 1, wherein the shut-down temperature is a temperature corresponding to the air permeability (Gurley value) of 100,000 sec/100 cc, when the temperature is increased as the function of time.

7. The system for determining the shut-down temperature and melt-down temperature of a separator according to claim 1, wherein the melt-down temperature is a temperature at a point where the air permeability (Gurley value) of the separator starts to be decreased from 100,000 sec/100 cc after the shut-down temperature has been reached, and the temperature is still increasing.

8. The system for determining shut-down temperature and melt-down temperature of a separator according to claim 1, wherein the first through-hole and the second through-hole have an average diameter of 2-15 mm.

9. The system for determining shut-down temperature and melt-down temperature of a separator according to claim 1, further comprising a storage unit recording the shut-down temperature and the melt-down temperature of the separator calculated by the controlling unit.

10. The system for determining shut-down temperature and melt-down temperature of a separator according to claim 1, further comprising a display unit displaying the shut-down temperature and the melt-down temperature of the separator calculated by the controlling unit.

11. The system for determining shut-down temperature and melt-down temperature of a separator according to claim 1, wherein the heating unit is electrically connected with the temperature sensor.

* * * * *